(12) United States Patent
Ganesh (10) Patent No.: US 6,282,526 B1
(45) Date of Patent: Aug. 28, 2001

(54) FUZZY LOGIC BASED SYSTEM AND METHOD FOR INFORMATION PROCESSING WITH UNCERTAIN INPUT DATA

(75) Inventor: Chidambar Ganesh, Bristol, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/246,208

(22) Filed: Jan. 20, 1999

(51) Int. Cl.$^7$ .......................................... G06N 7/02
(52) U.S. Cl. ............................ 706/8; 706/10; 342/13
(58) Field of Search .................. 706/10, 8; 382/156; 342/13

(56) References Cited

U.S. PATENT DOCUMENTS

| 5,287,110 | * | 2/1994 | Tran ................................ 342/13 |
| 5,497,430 | * | 3/1996 | Sadovnik et al. ................. 382/156 |
| 5,884,294 | * | 3/1999 | Kadar et al. ..................... 706/10 |

OTHER PUBLICATIONS

Singh, R.–N.P.; Bailey, W.H., Fuzzy logic applications to multisensor–multitarget correlation, Aerospace and Electronic Systems, IEEE Transactions on, vol.: 33 Issue: Jul. 3, 1997, pp.: 752–769.*

Tarel, J.–P., Multi–objects interpretation, Pattern Recognition, 1996., Proceedings of the 13th International Conference on, vol.: 1, Aug. 25–29, 1996, pp.: 612–616 vol. 1.*

Russo, F.; Ramponi, G., Fuzzy methods for multisensor data fusion, Instrumentation and Measurement, IEEE Transactions on, vol.: 43 Issue: Apr. 2, 1994, pp.: 288–294.*

Beckerman, M., A Bayes–maximum entropy method for multi–sensor data fusion, Robotics and Automation, 1992. Proceedings., 1992 IEEE International Conference on, May 12–14, 1992, pp.: 1668–1674 vol. 2.*

* cited by examiner

Primary Examiner—Mark R. Powell
Assistant Examiner—Wilbert Starks
(74) Attorney, Agent, or Firm—Michael J. McGowan; Michael F. Oglo; Prithvi C. Lall (57) ABSTRACT

A fuzzy logic information processing system and method are disclosed that may be used not only with known or definite data input but also with uncertain data input. The uncertain data input may be represented by a set of values wherein the possibility of any particular or specific value within the set being the true or accurate value is uncertain. The preferred embodiment of the system provides for an extensor to extend or map a representation of the uncertain data into at least one additional dimension related to dimensions of a set of rules used for making fuzzy logic inferences. The set of rules may be provided effectively in a mapped or graphed form. The set of rules and uncertain data are combined, for instance by locating intersection regions, to produce an output set that may be also be described as a map or plot. In a presently preferred embodiment the uncertain inputs and rules are represented mathematically or symbolically and then operated on to produce an output set. A projector then projects the output set to the desired output dimension as an output for the system. The system output may then be used for control purposes such as, for example only, a combat control system to provide a tactical picture, decision aid, presets for a guidance system, or the like.

20 Claims, 4 Drawing Sheets

FUZZY LOGIC BASED SYSTEM AND METHOD FOR INFORMATION PROCESSING WITH UNCERTAIN INPUT DATA

STATEMENT OF THE GOVERNMENT INTEREST

The invention described herein may be manufactured and used by or for the Government of the United States of America for Governmental purposes without the payment of any royalties thereon or therefore.

BACKGROUND OF THE INVENTION (1) Field of the Invention

The present invention relates generally to data integration and decision support systems based on fuzzy logic and, more specifically, to a fuzzy logic based system and method for information processing that is capable of handling uncertainty in the input data.

(2) Description of the Prior Art

Combat system information processing entails the integration of data from diverse sources for tactical picture generation and maintenance, situation assessment and planning, and allocation/control of resources. Current methods for data integration and decision support in submarine combat systems do not adequately account for uncertainty in the input data in an automated fashion. Instead they rely heavily on operator manipulation and human interpretation. On the other hand, in recent years the amount and flow rate of input data for integration has been rapidly increasing. It is anticipated that advances in sensor technology will continue to offer more possibilities in gathering both acoustic and non-acoustic data from organic as well as off-board sources, environmental and kinematic monitors, and intelligence reports. The combat system of the future therefore requires the ability to automatically manage uncertainty in the input data. Automated methods for handling uncertainty in the input data remains an outstanding technical issue and constitutes a significant Navy problem as well as a scientific and industrial challenge.

Uncertainty refers to being in a condition of doubt. This is contrasted to a condition of certainty or being definite, known, or specific. In an information processing context, uncertainty can be thought of as having a lack of definitive knowledge necessary to describe the process. Uncertainty in the input may result due to many causes including but certainly not limited to measurement noise, gaps in sensor information, sensor bias, inadequate number or placement of sensors, transmission noise or limitations, and the like. While most signals are measured within a tolerance, e.g., ten volts plus or minus one hundred micro volts, an uncertain signal is not known within the normal tolerances and may be so uncertain that normally used sensor tolerances are meaningless. Thus, while a tolerance of one hundred micro volts might be an accepted tolerance for an accurate signal in a particular application, an uncertain signal might vary by several volts or by more than one thousand times the normal accepted tolerance for the signal, thus making the signal quite uncertain in a particular application. Thus, a known or definite signal might be ten volts, an uncertain signal might be representable only as a possible value between eight and twelve volts. As another example of uncertain input, a sonar system working in a multipath environment may send out a sonar pulse and receive two or three sonar pulses in return. All three sonar pulses may be received within a time frame that would present reasonable distance/direction information for receipt from the intended target. Therefore, there is uncertainty associated with the acoustic propagathon path for each returned sonar pulse. As another example, it may be possible to get an approximate targeting solution value immediately since a decision for action may need to be taken now, whereas in time a more precise value will be available. This situation arises in a target motion analysis where a fundamental property of bearings-only target motion analysis is that contact range is not observable for a single-leg ownship motion (wherein a leg is defined as a time interval of constant platform velocity). The range becomes observable only after an ownship maneuver followed by a second leg of motion that therefore introduces a time-latency in the estimation process owing to the necessity of collecting sufficient data on all legs of motion. Thus, there are many different scenarios of types of uncertainty that will depend on each different situation.

As a general matter, an information processing system such as a combat control system or other typical control system will produce one or more specific or definite control signals in response to the input data. A representative example might include a tactical picture display that might show a submarine in relation to other targets. Another example might include a control for a motor to adjust rudder position. This is also true of a fuzzy logic-based control system. Fuzzy logic control systems have been employed successfully employed in various applications. Moreover, fuzzy logic controllers have been successfully applied and demonstrated in underwater combat control systems such as, for example, a conditioned fuzzy logic controller for an acoustic vehicle intercept guidance system.

A prior art fuzzy inference system has three basic components. The fuzzifier converts discrete or crisp input numbers to fuzzy logic membership values that describe a qualitative description of the discrete input in semantic terms. For instance, a numerical sensor value such as might be produced from a sensor voltage might be converted from its discrete, known, or specific values to a fuzzy logic membership value in a qualitative class, e.g., low, medium, or high. The output of the fuzzifier is represented in these membership values, and comprises the fuzzy input membership values. The fuzzifier is not designed to handle an input that is inexact and has a possibility of varying throughout a range of values.

The input membership values are used by an inference engine. The inference engine employs a knowledge base of rules that permit one or more inferences, and subsequent aggregation of all the output membership functions from the rules that are triggered by the fuzzy input membership values. Thus, the inference engine maps the fuzzy input membership values to a single fuzzy output set based on applicable rules from the knowledge base.

The defuzzifier converts the fuzzy output set to a crisp, discrete, particular output value for subsequent usage, e.g., the controller output in a feedback system. The crisp output is representative of the fuzzy output set and might be analogous to the expected value in a probability distribution.

In summary, a conventional fuzzy system does not have the mechanism to handle an uncertain input, yet such inputs are typically encountered in practice, e.g., data integration for submarine combat control. Simply taking an average, making an estimate, or calculating a normal value and using the discrete value so determined as input to the fuzzy logic inference system will limit the information that is available about the uncertainties, and thereby reduce the likelihood of making the best possible decision. Consequently, there remains a need for a fuzzy logic-based information processing system that can handle uncertain input. Those skilled in the art will appreciate the present invention that addresses the above and other problems.

SUMMARY OF THE INVENTION

Accordingly, it is an object of the present invention to provide an improved system and method for processing data using fuzzy logic.

It is another object of the present invention to use a fuzzy logic system that is capable of processing either certain or uncertain data.

It is yet another object of the present invention to provide an improved control system and method.

It is yet another object of the present invention to provide an improved tactical picture and decision support system.

These and other objects, features, and advantages of the present invention will become apparent from the drawings, the descriptions given herein, and the appended claims.

In accordance with the present invention, a fuzzy logic system for processing information including uncertain information is disclosed. At least one input provides information that is indicative of one or more physical phenomena. The input is representable by an input set that describes a range of possible values related to the one or more physical phenomena. When a precise value for the input is not available such that the input value is uncertain, then input set is representable mathematically by a first map of possible values related to the one or more physical phenomena.

The fuzzy logic system comprises an extensor for operating on the input set to produce an operated set of values that may be represented by an extension of the first map using what might be called an extensor or cylindrical extensor. An inference engine for the fuzzy logic system includes a plurality of rules related to the one or more physical phenomena. The inference engine is operable for manipulating the operated set of values using the plurality rules for producing a conditioned set of values. A projector or retro-projector is provided for producing an output signal from the conditioned set: of values. The output signal may be used for various purposes such as in displaying a picture such as a tactical picture or providing other decision support assistance. The output signal could also be used in a control system such as a guidance and navigation control system, or the likes.

In one embodiment of the invention, the rules may be represented mathematically by a second map. The conditioned set may be represented as a third map that is effectively formed by an intersection of the extended first map and the second map. The projector produces a signal that may be represented as a mapping with one dimension of the third map being collapsed and provided such that the output signal is in the desired terms.

A method is provided for a control system such as for a combat control system for utilizing uncertain input data that has an uncertain value that is contained within a range of possible values. The uncertain input data is representative of physical phenomena and may be derived from multiple different physical phenomena or may be representative of some particular phenomena. For instance, an input representative of a particular target or platform such as a ship or submarine may be derived from information such as sonar signals that indicate the frequency of propeller rotation and/or the number of propellers detected and so forth. The information may be inconclusive about what type of platform is detected but may provide a range of possibilities as discussed in more detail subsequently.

The uncertain input data is presented for use in a fuzzy logic system with the representation providing a set of possible values for the input data without designating a specific value for the uncertain input data. Rules are provided for the fuzzy logic system in terms related to the uncertain input data such as giving possibilities of the likelihood of diesel or nuclear operation and the associated speeds thereof. An output is then inferred from the fuzzy logic system using the set of possible values for the input data and the rules. The uncertain input data may be described by mathematical values although it is possible also that linguistic rules and/or symbols and/or other types of logic could be used. Similarly the rules for the fuzzy logic system may be represented in terms that may be described by a second set of mathematical values although, as discussed above, it is possible that other types of representations could be made. A third set of mathematical values is produced based on the first set and the second set. In a presently preferred embodiment, the third set effectively comprises an intersection of the first set and the second set. The output from the fuzzy logic system is then used for various purposes such as for providing a tactical picture.

The fuzzy logic system of the present invention could be used in a control system, such as a combat control system, that comprises at least one sensor for producing a sensor signal used to produce input information for the control system. The fuzzy logic inference system of the control system is operable for receiving the input information when the input information is precise and also when the input information is uncertain such that a representation of the information is produced when the input information is precise and also when the information is uncertain. Thus, the system can handle either uncertain or certain information. When the input information is uncertain, the representation is descriptive of a range of possible values for the input information and the fuzzy logic inference system is operable for comparing the representation to a set of rules to produce an output control signal. An extensor or cylindrical extensor is used for operating on the input information to produce a first map by introducing at least one additional dimension to the input information. The at least one additional dimension is related to the set of rules. It will be noted that the present invention may be used with many dimensions such that the steps of operation may not always be easily visualized. The rules are represented by a second map that includes the at least one additional dimension. The fuzzy logic inference system is operable for comparing the first map to the second map to produce a third map A projector or retro projector may be used for operating oil the third map to form a projection onto a dimension for the output control signal.

The output control signal, as yet another example, may be used in a decision support system to provide a range of possibilities for aiding the decision maker.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein corresponding reference characters indicate corresponding parts throughout several views of the drawings and wherein.

BRIEF DESCRIPTION OF THE PREFERRED EMBODIMENTS

Figure 1:
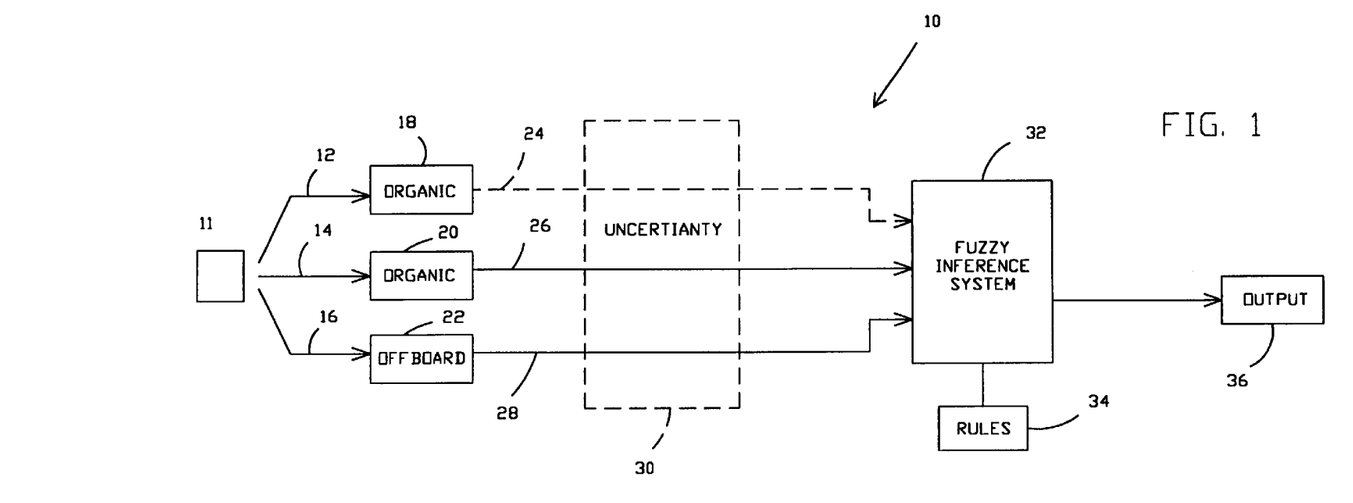
FIG. 1 is a block diagram of a fuzzy logic information processing system in accord with the present invention.

Referring now to the drawings and more specifically to FIG. 1, there is shown an embodiment of an information processing system in accord with the present invention. Fuzzy logic processing system 10 illustrates that stimulus 11 is detected and its characteristics; are relayed to output 36 using fuzzy logic when uncertainties related to stimulus 11 and/or other aspects of the input exist. Thus, the problem involves uncertainties that propagate through system 10. Stimulus 11 may be one or more physical phenomena of some type such as propeller rotation frequency or pattern and may produce one or more of signals 12, 14 and 16. One or more of signals 12, 14, and 16 are received by remote organic sensor 18, organic sensor 20, and/or off board sensor 22, respectively. Signals 12, 14 and 16 could be descriptive or related to a natural physical phenomena such as acoustic or electromagnetic waves intercepted by sonar or radar receivers. Remote organic sensor 18 and organic sensor 20 use in this case the definition of organic as being sensors associated with the body or craft in that the sensors are either attached to craft or are remote but controlled by the craft. Organic sensors can therefore include a remotely launched probe, sonar, radar, or any type of device which detects physical phenomena such as, for instance, detection of another object for tracking purposes. Off board sensor 22 is independent of the body or craft and can transmit the data relating to stimulus 11 which, as discussed above, may represent numerous different types of stimuli. The data collected by sensors 18, 20 and/or 22 are transmitted through respective possible transmission paths 24, 26 and 28. These paths may have physical imperfections which can cause gaps in the data, as depicted by uncertainty 30. Uncertainty 30 could arise in many ways and at many places in the processing system and is pictured in a specific place only for convenience. For instance, sensors 18, 20 and 22 may not have detected all signals or have received erroneous information, thus more uncertainty is present. There may be a time lag problem as discussed subsequently. It will be understood by those skilled in the art that there are virtually an infinite number of reasons that can arise to cause uncertainty within the input data. Thus, the result is that data with inherent uncertainties is received by fuzzy inference system 32 from one or more of signal paths 24, 26, and/or 28.

Whiles prior art fuzzy inference systems cannot handle uncertain data, the inference system of the present invention can handle uncertain or certain data, as explained in more detail hereinafter, using rules 34 within fuzzy inference system 32 to yield output 36, that may be used for producing a tactical picture, guidance presets, motor control, decision support, and the like.

Figure 2:
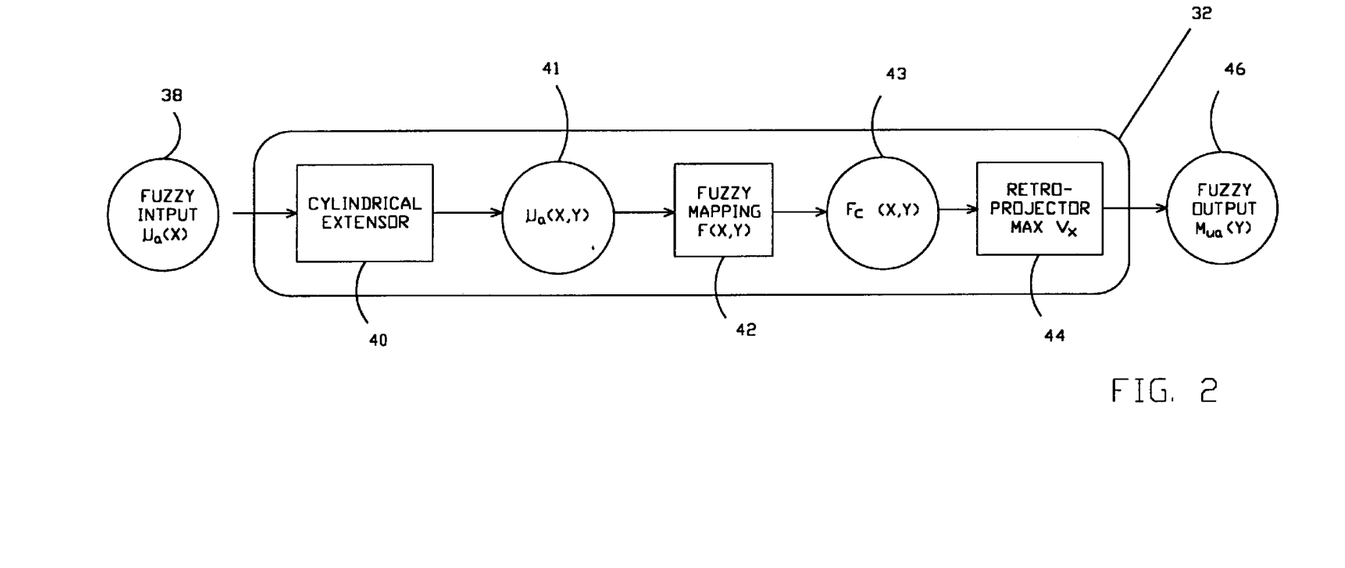
FIG. 2 is a block diagram of a fuzzy logic inference system as might be used in the fuzzy logic information processing system of FIG. 1.
Figure 5:
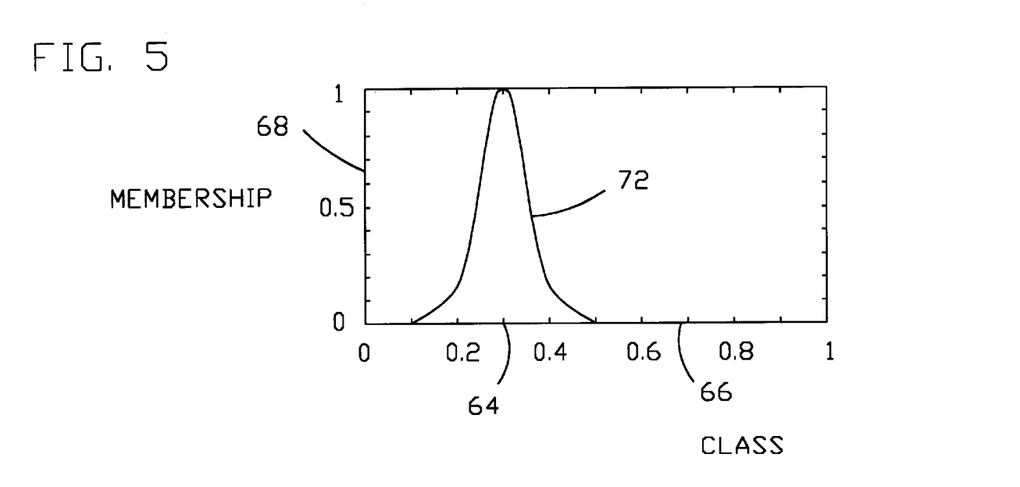
FIG. 5 is an arbitrary graph descriptive of a bell or Gaussian curve that shows a set of possible values for the input for which any particular value in the set is uncertain.

A presently preferred embodiment of fuzzy inference system 32 is shown in greater detail in FIG. 2. The collective data sent over paths 24, 26 and/or 28 detected by sensors 18, 20 and 22 contains uncertainty as represented graphically by the region of fuzzy input 38 wherein it is uncertain what the precise value of fuzzy input 38 is. Fuzzy input 38 is mathematically represented by $\mu_a(x)$, with collective data that varies about the line x=a. Thus, whereas the prior art fuzzy inference system would require a precise input, such as x=a, the system of the present invention can handle the uncertain input where it is known only that input x varies about a to form a set of possible values described by the function $\mu_a(x)$. The region or set of values described by $\mu_a(x)$ is arbitrarily selected in the present example and could take on many different forms or shapes. For the present explanation purposes, a Gaussian bell type curve distribution describes the region of possible values for the input as shown by FIG. 5. The input could be in the form of a square wave, pulse, multiple sections, or other shapes. While the example given herein uses a numerical characterization of uncertain data, it will be understood that the present invention is not limited to numerical characterization and could also be used with other types of symbolic characterizations of data as might be used for the particular problem to be solved.

Fuzzy input 38 is received by fuzzy inference system 32 and operated on by extensor or cylindrical extensor 40. Cylindrical extensor 40, in the present example, operates on fuzzy input 38 to provide an extension of fuzzy input 38 in the x, y plane to form extension 41, as represented by $$\mu_a(x,y)=\mu_a(x) \forall y. \qquad (1)$$

Extension 41 might be graphically described as adding an extra dimension or, in this case, a third dimension. However, it will be understood that depending on the complexity of the problem many dimensions may be involved so that a visually understandable picture of an extended bell curve as might be exemplified by FIG. 6 may not always be available for every problem. The modified data or extension 41 is made available for fuzzy mapping section 42 for further operation. Fuzzy section 42 is derived from rules 34 and is mathematically represented by F(x,y) as might be visualized in one example by FIG. 4 discussed below. Fuzzy mapping section 42 operates on extension 41 to yet again amend the data to form the conditioned data or surface 43 or $F_c(x,y)$ which might be visualized in one example as shown in FIG. 7. The whole operation performed by fuzzy mapping 42 can be described as $$F_c(x,y)=\min[F(x,y), \mu(x,y)]. \qquad (2)$$

Figures 8, 9:
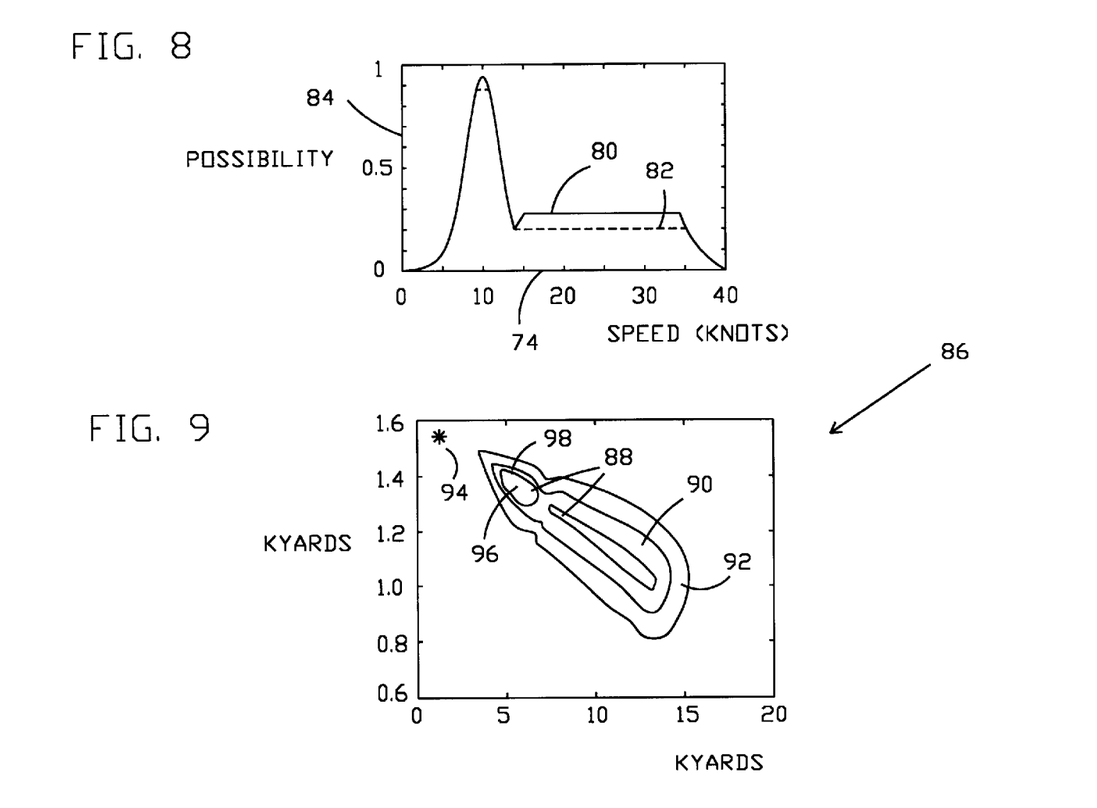
FIG. 8 is an output for the system that shows the output in the desired terms and also compares a fixed value input with the results of an uncertain input.
FIG. 9 discloses one of many possible tactical displays in which the output of the present invention may be used.

In the example of the present case, this can be verbally, symbolically, or linguistically restated as the graphical intersections of rules 34 and the output of cylindrical extensor 40 to form conditioned surface 43. Now retro-projector 44 receives the $F_c(x, y)$ or conditioned surface 43 and transforms it into fuzzy output 46 or $M_{\mu a}(y)$ as might be graphi cally represented as shown in FIG. 8. This process can be symbolized by the formula $$M_{\mu a}(y)=\max_{2x}[F_c(x,y)]. \quad (3)$$

The process of the above equation may be visually or graphically described as projecting the data output from fuzzy mapping 42 onto the y plane, resulting again in two dimensional data having the desired output units as shown, for example in FIG. 8.

Figure 3:
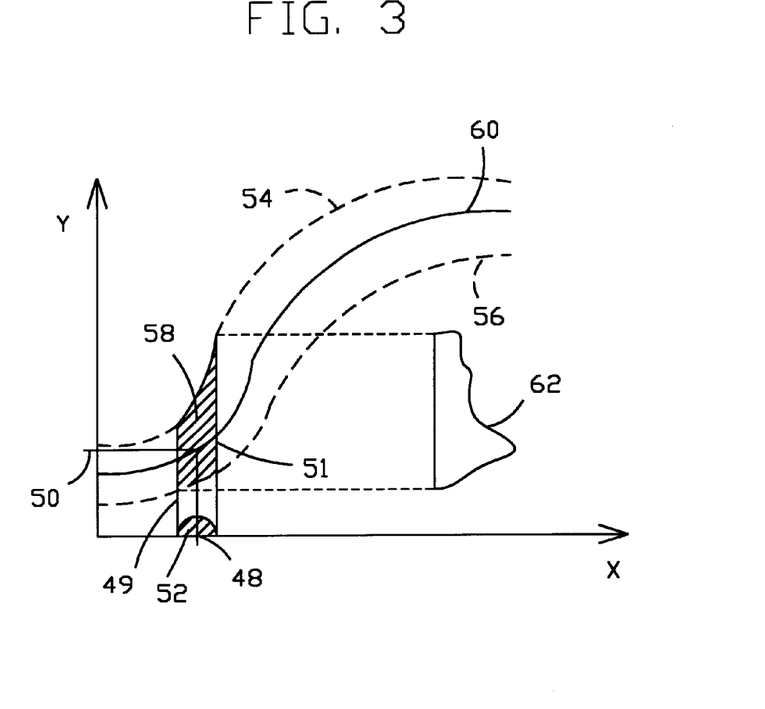
FIG. 3 is a graphical representation of the process of mapping an uncertain input through a fuzzy logic inference system to the desired output.

FIG. 3 provides an example that Graphically depicts the operation of fuzzy inference system 32 in a particular case as discussed below. Point 48 represents the value x=a, an exact value. While a prior art fuzzy logic inference system would require such an exact value, a crisp input value is not known in the present example so shaded region 52 generalizes x as being in that area, defined by the function $\mu_a(x)$. Had x=a been known, point 50 would represent y=b, an exact value as might be described using a prior art fuzzy logic inference system. The cylindrical extensor extends the function $\mu_a(X)$ into another dimension with $$\mu_a(x,y)=\mu_a(x) \forall y. \quad (4)$$

as discussed above. The input data now is uncertain but the set of possible values has the form $\mu_a(X,y)$ represented by the shaded area between lines 49 and C1. The rules are graphically described as the value between lines 54 and 56 and represented by F(x,y). Shaded region 58 is generated by the cylindrical extensor output and the rules to form the conditioned surface, represented by $F_c(x,y)$. In other words, the area defined by lines 49, 51, 54 and 56. Mathematically, $F_c(x,y)=F(x,y) ?\mu)(x,y)$, with ? being a fuzzy composition operation. In comparison, had exact values been known as required in a prior art fuzzy logic inference system, line 60 would accurately depict this output. Finally, the data is transformed back into usable form by projecting the graphical image into the desired units by removing a dimension, represented by line 62. This is the fuzzy output $M_{\mu a}(y)$, given by $$M_{\mu a}(y)=\max_{2x}[F_c(x,y)]. \quad (5)$$

FIGS. 4–9 give a possible example of a step-by-step graphical representation of the process of fuzzy inference system 32 using more specifically an example of tracking a platform such as a submarine or ship in relation to another platform. It will be understood that this is one example only given for explanatory purposes only. The invention is not intended to be limited by this example and may be used in different applications and conditions, including, but not limited to: medical, industrial, marine, warfare, exploration, and numerous other settings.

Figure 4:
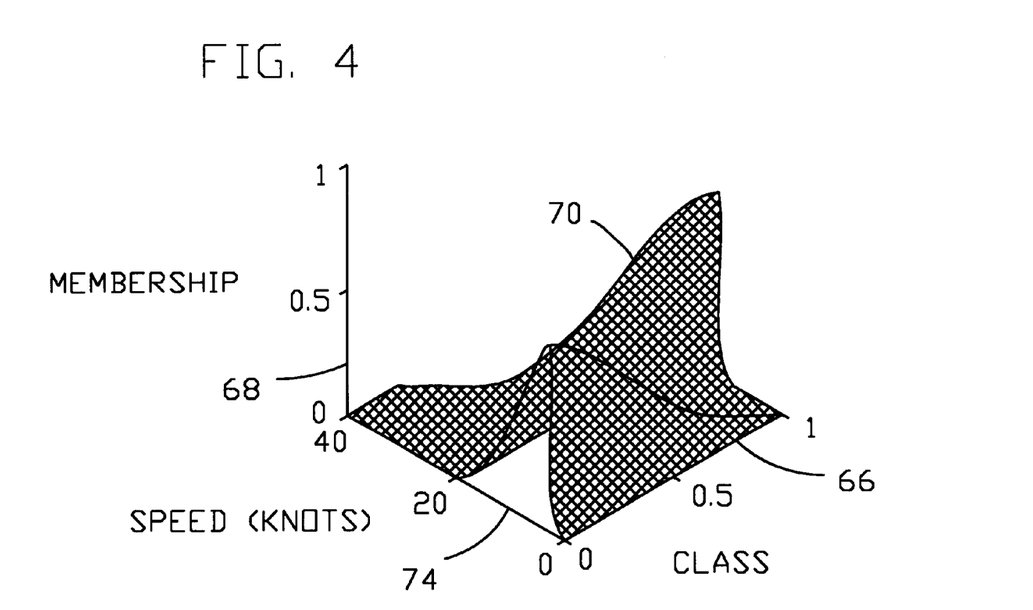
FIG. 4 is a map of rules for a particular illustrative inference system in accord with the present invention.

Referring now to FIG. 4 and subsequent figures, the axes x, y and z are defined as class axis 66, membership axis 68 and speed axis 74, respectively. The example is based upon a two rule, one input, one output fuzzy inference system, which will provide target speed based upon detected class. The target will have a higher speed if it has a nuclear engine than if it has a diesel engine. Class axis 66 ranges from zero to one, with zero denoting diesel and one representing nuclear. Membership axis 68 also ranges from zero to one, with zero designating no membership and one indicating one hundred percent membership in the specified class. Therefore, a target is diesel if class equals zero and membership equals one, whereas a target is nuclear if class equals one and membership equals one. Speed axis 74 ranges from zero to forty, or the range of speed of the target in knots. A nuclear engine target is more likely to be traveling in the range of 15 to 30 knots as compared with a diesel engine target with a speed more likely in the range of 5 to 15 knots. The rules can be summed up as the following: (1) if class is diesel, then speed is low and (2) if class is nuclear then speed is high, as depicted by the three dimensional rule graph 70 represented by the function F(x,y). The rules for the present example are graphically displayed as a set, map, figure, or curve as shown in FIG. 4. It will be understood that while the map or set of values indicated may be easily visualized in three dimensions as in the example of FIG. 4, other systems of rules, inputs, and/or outputs may use many dimensional or n-dimensional maps that are not so easily visualized.

The example further continues with the fact that sensors and/or other intelligence have detected a target with class equal to about 0.3 with some amount of uncertainty. The sensors used for this purpose might conceivably be sonar receivers that detect a propeller speed or type of sound or the like. The result of the detected input is graphically depicted in FIG. 5 with an input that is uncertain but has possible values about point 64, representing x=0.3. For this example, a Gaussian membership function, graph, map or set 72 describes the fuzzy input. The target is not described exactly in class equal to 0.3, but rather is described as a possible value within the area under the curve but uncertain as to exactly what that value is. If the input were definite, such that the information was exactly 0.3, then the present invention would also operate to handle that situation in the same manner as discussed below. Function 72 would then simply be a straight line at 0.3. Thus, the present invention is operable with both definite and uncertain data. However assuming the input to be uncertain, then Gaussian membership function 72, for an example only, may have formula equal to $$\mu_{0.3}(x) = \exp\left[-\frac{(x-0.3)^2}{2*0.05^2}\right] \quad (6)$$

Figure 6:
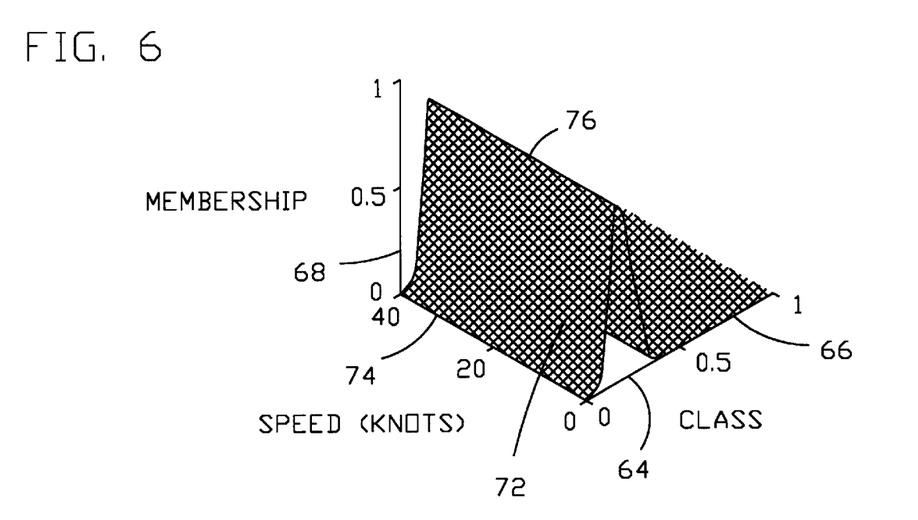
FIG. 6 is a map of the uncertain data of FIG. 5 that has been extended into another dimension by an extensor or cylindrical extensor in accord with the present invention.
Figure 7:
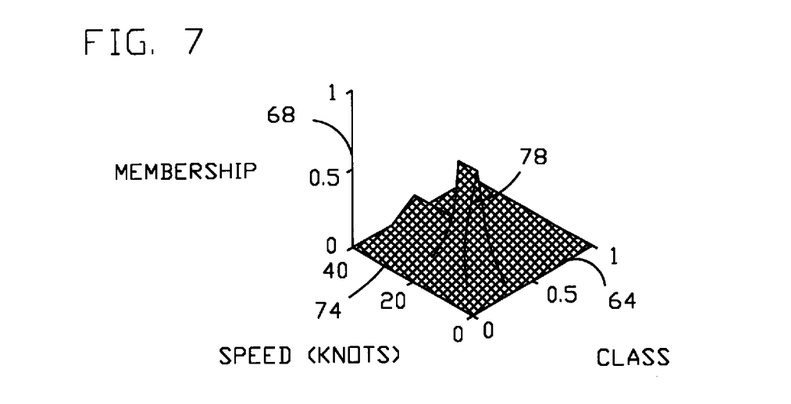
FIG. 7 is a map of the combination of the map of FIG. 4 and the map of FIG. 6.

In accord with the system and method of the present invention, Gaussian membership function 72 is extended onto speed axis 74 to make cylindrical extension map, function, set or graph 76 as shown in FIG. 6, depicting the operation of extensor or cylindrical extensor 40. Thus, the input is extended onto at least one dimension characteristic of the rules. Cylindrical extension map, set, function or graph 76, represented by $\mu_{0.3}(x,y)$, is obtained by the mathematical expression discussed above, i.e., $$\mu_a(x,y)=\mu_a(x) \forall y. \quad (7)$$

Fuzzy mapping section 42 operates on cylindrical extension map, set, or graph 76 and rule map, set, or graph 70. In the present example an intersection is found as the result of this operation that provides map, set, or conditioned surface graph 78 as shown in FIG. 7. Conditioned surface map, set or graph 78, noted as $F_c(x,y)$, was obtained in accord with the equation expressed above, i.e., $$F_c(x,y)=\min[F(x,y), \mu(x,y)]. \quad (8)$$

In FIG. 8, conditioned surface graph 78 is fed into the retro-projector where the graph is projected onto speed axis 74 and possibility axis 84. A dimension is reduced in accord with the desired output terms resulting in two dimensional output fuzzy data 80. Interpretation of this graph states that the target is more likely to be traveling about ten knots, but still has the possibility of going about twenty to thirty knots, though this is not as likely. Line 82 is the graph obtained had exact values been taken with x=0.3, resulting in the uncertainty obtained using fuzzy input being deleted and never taken into account. Had this been done as would have been a plausible solution for prior art fuzzy logic inference systems that require an exact input, then the likelihood would have been significantly greater that the speed in the range of about ten knots. Thus, a decision maker might have been more likely to make a decision that committed too early a decision based on the target speed being in the range of about ten knots. A better decision would have been to wait as long as possible before committing due to the increased possibility that the speed was in the range of from fifteen to thirty knots when the uncertainty of the input was included in the calculation.

In a bearings-only target motion analysis problem it is necessary to estimate contact location and motion parameters using a time series of bearing measurements. A fundamental problem of the bearings-only target motion analysis application is that the contact range is not observable for a single-leg of ownship motion wherein a leg is defined as a time interval of a constant platform velocity, such as that of a ship or submarine. A time lag is therefore introduced into the estimation process owing to the necessity of collecting sufficient data on all legs of motion. In some cases rapid estimates are needed even though they may be of poorer quality due to the time urgency of the tactical situation. Tactical map 86, shown in FIG. 9, is one possible resulting use of the data obtain about the target. The fuzzy characterization of contact speed as discussed above using the fuzzy logic inference system output as shown in FIG. 8 is used to produce an enhanced area of uncertainty description for the single leg target motion analysis. Tactical map 86 shows in Kyards the target's suspected contact end-point position 96 in relation to observer 94. Tactical map 86 also displays area 88, depicted 50% possibility of the target end point being in that area. Area 90 depicts 85% confidence, and area 92 denotes 98% confidence of the target being within those borders. For reference, location 98 is the actual target end point position. While end-points of the likely tracks are displayed in tactical map 86, the various possible tracks with the most likely track may also be viewed with a colored intensity weighting for the likelihood of the various tracks.

In summary, the present inventional is operable for using uncertain data as described as an example only in FIG. 5. This data is operated on to produce data with one or more dimensions added as shown in this example in FIG. 6. The rules are graphically displayed in this example in FIG. 4. The result of operating on the extended data with the rules is shown in FIG. 7. This data is then projected onto the units desired for output as shown in FIG. 8. The resulting output may then be used in a control system as desired and can be seen in the tactical display of FIG. 9.

It will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. A fuzzy logic system for processing information from at least one input that is associated with one or more physical phenomena, said at least one input being described as an input set including a plurality of possible values with uncertainty as to which of said plurality of possible values is the actual value of said at least one input, said fuzzy logic system comprising:

an extensor for operating on said input set to produce an operated set of values;

an inference engine that includes a plurality of rules related to said one or more physical phenomena, said inference engine being operable for comparing said operated set of values with said plurality of rules for producing a conditioned set of values; and a projector for producing an output signal from said conditioned set of values.

2. The system of claim 1 wherein said output signal is used for producing a display.

3. The system of claim 1 wherein said output signal is used as a control signal.

4. The system of claim 1 wherein said operated set operated set of values may be represented by a first map and said rules may be represented by a second map.

5. The system of claim 4 wherein said conditioned set may be represented as a third map that is an intersection of said first map and said second map.

6. The system of claim 5 wherein said projector produces a signal that may be represented as a conditioning of said third map with respect to desired output units.

7. A method for a control system for utilizing uncertain input data that has an uncertain value contained within an input set of possible values, said uncertain input data being associated with one or more physical phenomena, said method comprising the steps of:

representing said uncertain input data for use in a fuzzy logic system, said representation describing said input set of possible values without designating a specific of said possible values for said uncertain input data;

providing a plurality of rules fi r said fuzzy logic system in terms related to said uncertain input data; and inferring an output from said fuzzy logic system based on said plurality of rules and said set of possible values for said input data.

8. The method of claim 7 further comprising operating on said input set of possible values to produce a first set of possible values.

9. The method of claim 8 further comprising representing said rules for said fuzzy logic system in terms that may be described by a second set of values.

10. The method of claim 9 further comprising producing a third set of values from said first set of values and said second set of values.

11. The method of claim 10 wherein said third set comprises an intersection of said first set and said second set.

12. The method of claim 7 further comprising:

producing a tactical picture that incorporates said output from said fuzzy logic system.

13. The method of claim 7, further comprising:

providing a system control signal from said output of said fuzzy logic system.

14. A control system, comprising:

at least one sensor for producing a sensor signal, said sensor signal being used to produce input information for said control system; and a fuzzy logic inference system for said control system, said fuzzy logic inference system being operable for receiving said input information when said input information is definite and also when said input information is uncertain such that a representation of said information is produced when said input information is definite and also when said information is uncertain, when said input information is uncertain said representation provides for a set of possible values for said input information, said fuzzy logic inference system being operable for comparing said representation to a set of rules to produce an output control signal.

15. The control system of claim 14 wherein said output control signal is used to create a tactical picture display.

16. The control system of claim 14 wherein said fuzzy logic inference system further comprises:

an extensor for operating on said input information to produce a first map by introducing at least one additional dimension to said input information, said at least one additional dimension being related to said set of rules.

17. The control system of claim 16 wherein said rules are represented by a second map that includes said at least one additional dimension.

18. The control system of claim 17 wherein said fuzzy logic inference system is operable for comparing said first map to said second map to produce a third map.

19. The control system of claim 18 wherein said fuzzy logic inference system further comprises:

a projector for operating on said third map to form a projection onto a dimension for said output control signal.

20. The control system of claim 14 further comprising:

a decision support system wherein said output control signal is used to provide a display depicting range of possibilities.

* * * * *